R. M. ODELL.
RECEPTACLE AND CARRIER FOR EGGS.
APPLICATION FILED DEC. 6, 1912.
1,084,751.
Patented Jan. 20, 1914.
3 SHEETS—SHEET 3.
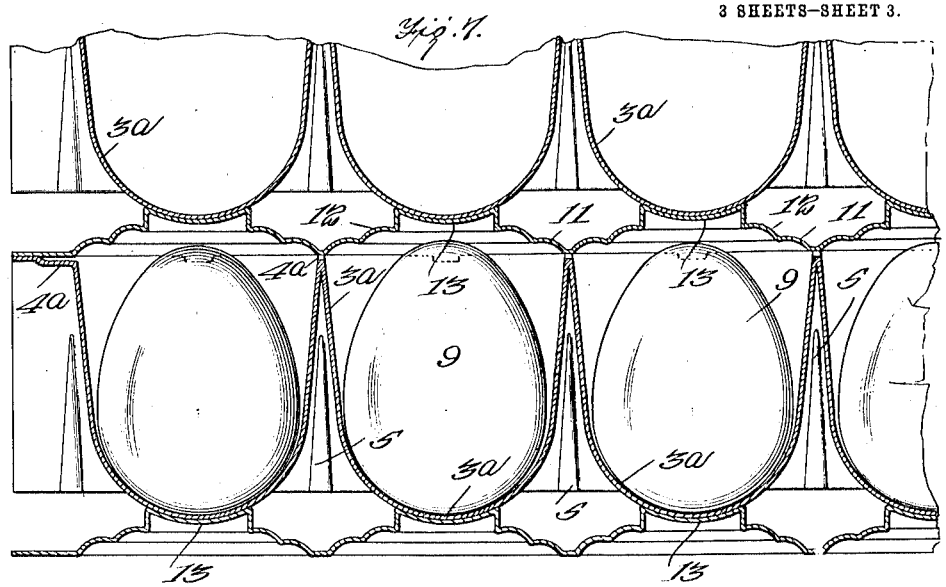
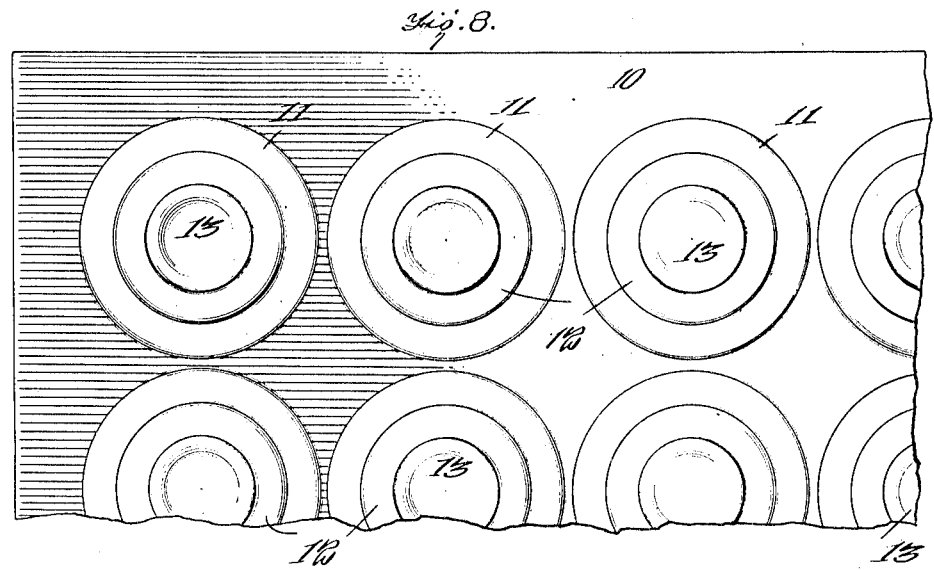
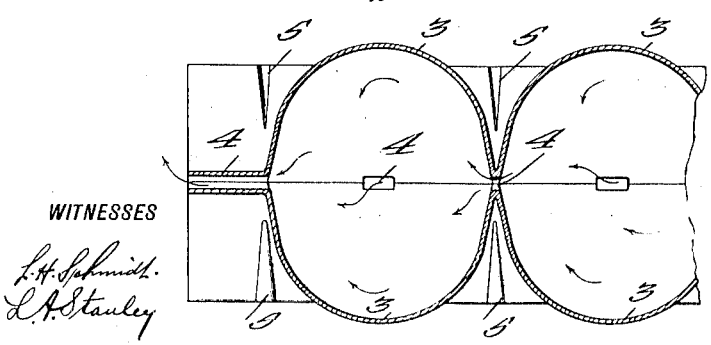
WITNESSES
INVENTOR
RISDON M. ODELL,
BY
ATTORNEYS

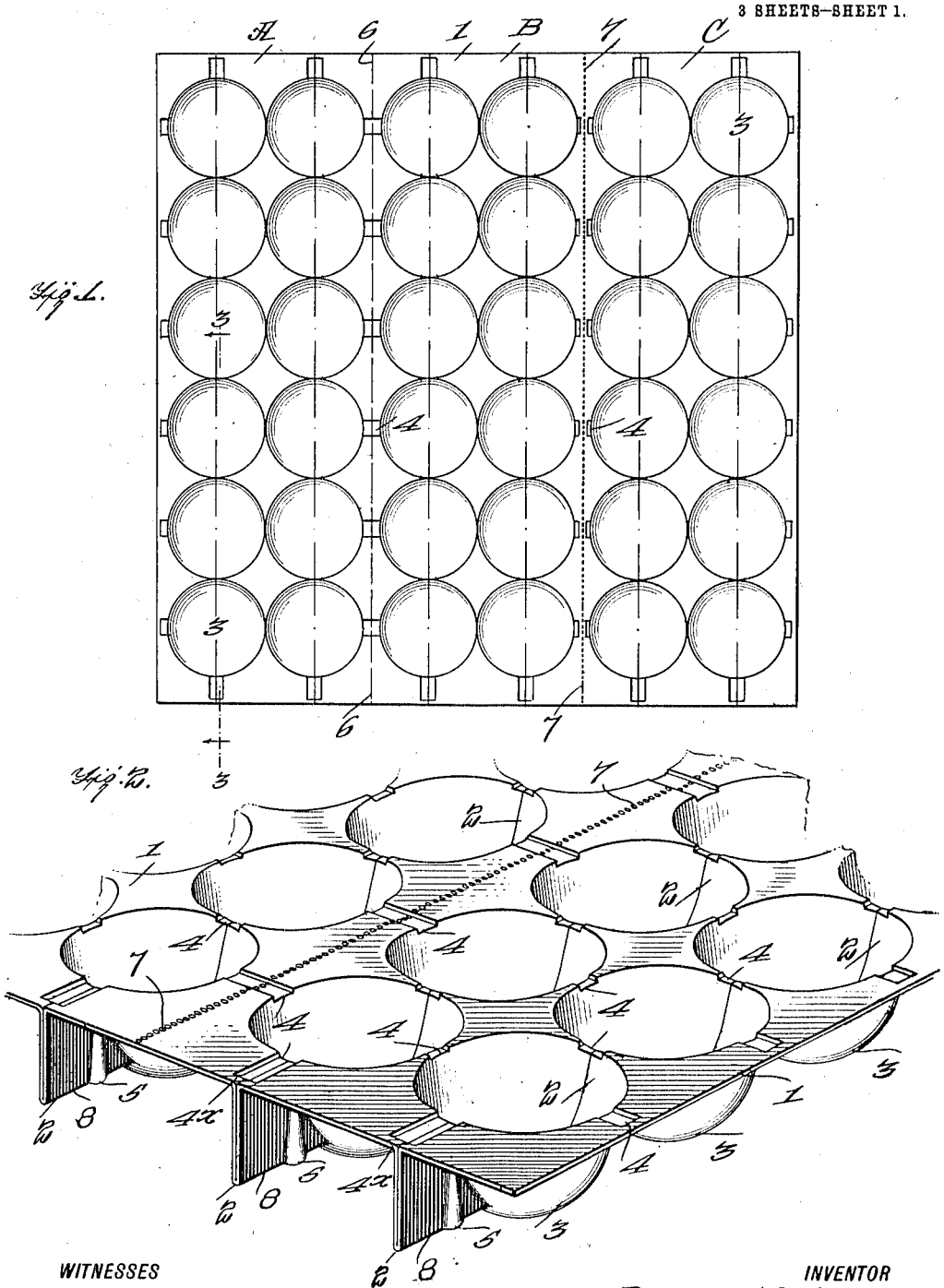

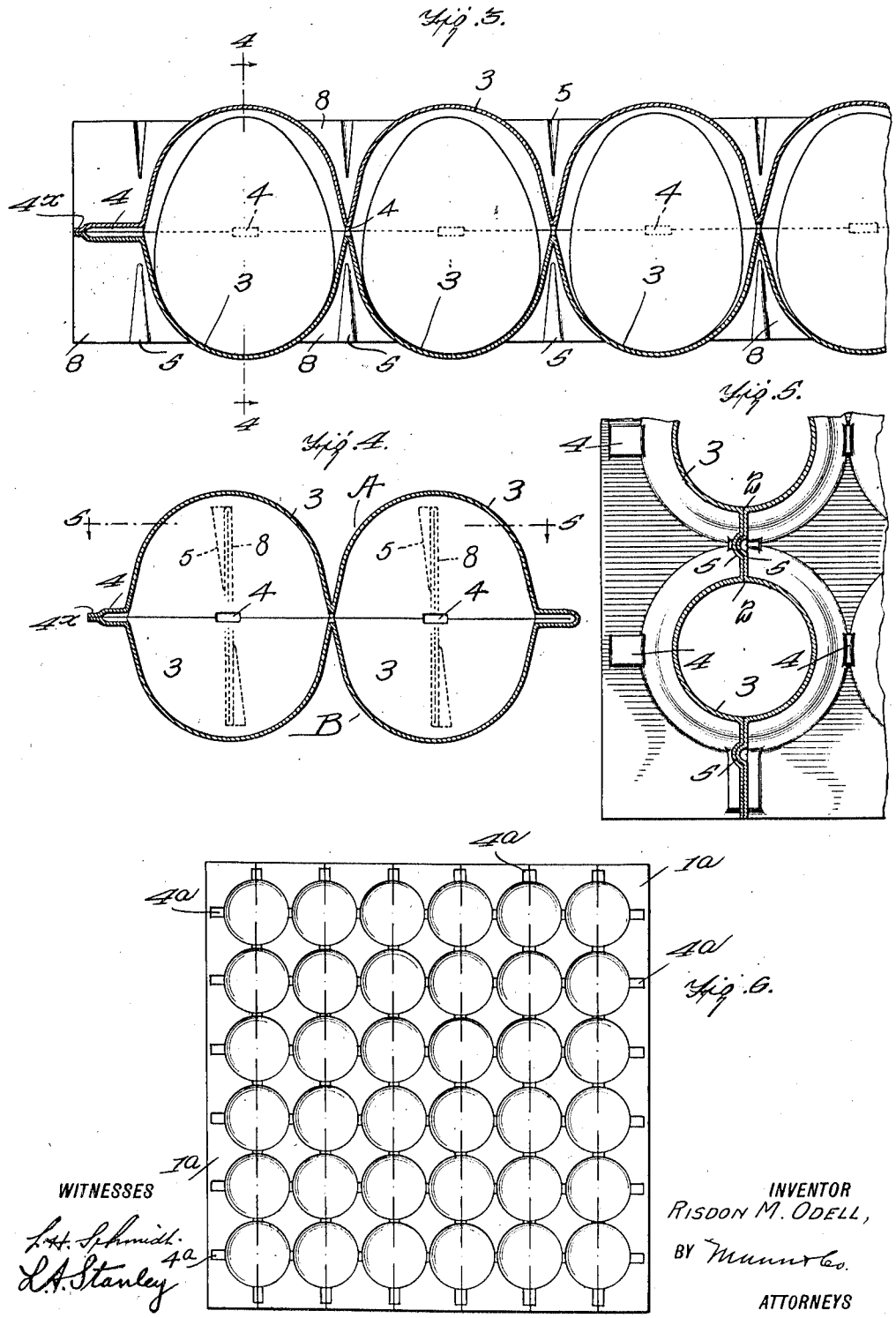

UNITED STATES PATENT OFFICE.

RISDON MOORE ODELL, OF HUTCHINSON, KANSAS, ASSIGNOR TO WILLIAM S. S. JOHNSON, OF PLAINFIELD, INDIANA.

RECEPTACLE AND CARRIER FOR EGGS.

1,084,751. Specification of Letters Patent. Patented Jan. 20, 1914.

Application filed December 6, 1912. Serial No. 735,263.

*To all whom it may concern:*

Be it known that I, RISDON MOORE ODELL, a citizen of the United States, and a resident of Hutchinson, in the county of Reno and State of Kansas, have made certain new and useful Improvements in Receptacles and Carriers for Eggs, of which the following is a specification.

My invention relates to improvements in receptacles and carriers for eggs and it consists in the constructions, combinations and arrangements herein described and claimed.

An object of my invention is to provide a receptacle for eggs which are shipped in the ordinary egg case, and which will prevent the breakage of the egg and which will also provide an air-tight and light-proof chamber for each egg, thereby tending to prevent their decomposition.

A further object of my invention is to provide a series of attached chambers or cells which will fit the ordinary egg case, but which may be sub-divided to form cartons, each carton containing a dozen eggs. These cartons are therefore of the proper size for selling the eggs directly by retail, and will therefore obviate the necessity of the use of special cartons for this purpose.

A further object of my invention is to provide a novel means of inclosing the eggs which is strong and durable.

Other objects and advantages will appear in the following specification and the novel features of the device will be particularly pointed out in the appended claims.

My invention is illustrated in the accompanying drawings forming part of this application in which—

Figure 1 is a plan view of a sheet with a number of cells impressed therein, Fig. 2 is a perspective view of a portion of the sheet shown in Fig. 1, Fig. 3 is a sectional view on the line 3—3 of Fig. 1, Fig. 4 is a sectional view on the line 4—4 of Fig. 3, after the parts are folded upon one another, Fig. 5 is a sectional view along the line 5—5 of Fig. 4, Fig. 6 is a plan view of a portion of a modified form of the device, Fig. 7 is a vertical section through the modified form of the device, Fig. 8 is a plan view of a portion of the cover of the modified form shown in Fig. 7, and Fig. 9 is a sectional view similar to Fig. 3 of another modified form of the device.

In carrying out my invention I make use of a single sheet of pasteboard such as that shown at 1 in Figs. 1 and 2. This sheet is moistened and sizing is applied. The sheet is then impressed with dies to form the half cells shown in Fig. 2. It will be observed that at 2 there is a fold or bend in the sheet, this fold or bend extending longitudinally and dividing each row of cells. On one side of this fold there is a series of quarter cells 3, the other side of the fold being provided with registering quarter cells. At the top of the cells is a laterally extending integral flange formed by the body portion 1 of the sheet. When the similar cells are impressed one quarter of the cell will be brought up to register with the adjacent quarter so as to form the half cell. At opposite sides of the cell along the fold and at 90° therefrom I press a groove 4. This forms a boss on the opposite side of the sheet, as shown in Figs. 3, 4, and 5 which strengthens the device at the points where it is weakest, i. e., between the cells and between the outer edges of the sheet and the outside cells. Between adjacent cells, it will be seen that the folded portion 2 is provided with a vertically extending impressed portion 5. When the two members of the folded portion come together one of these impressed portions 5 will enter the registering portion, as clearly shown in Fig. 5. The purpose of this will be explained later.

From the foregoing description of the various parts of the device the operation thereof may be readily understood.

In Fig. 1 it will be seen that I have provided a sheet containing thirty-six semi-cells. These semi-cells are arranged in groups of twelve each. At 6 I have shown a line where the sheet 1 is scored, so that it may be folded. At 7 is a perforated line by means of which a portion of the sheet containing the semi-cells may be torn off. Each side of the ordinary egg crate is of a size to contain layers of three dozen eggs each. Thirty-six eggs are placed in the semi-cells shown in Fig. 1. A second sheet of impressed cells precisely similar to the first is then placed over the eggs, thus making a receptacle which incloses the eggs entirely. The edges 4[x] of these sheets (see Fig. 3) may be secured together in any convenient manner. Another layer of eggs may then be placed on top of the first and the case may be filled. The eggs may be shipped without any other filler. The material of which the receptacle is made is such that it will exclude light and is preferably waterproof. When the eggs are inclosed, as shown in Fig. 3, the device is also air-tight. The receptacle keeps the eggs from breaking, but if in case of very rough usage an egg should break it cannot run into an adjacent compartment because of the fact that in order to do so it will have to pass the registering embossed portions 5 (see Fig. 5). This forms a joint through which the contents of the egg cannot flow. The contents themselves are of such a nature as to effectually seal the joint if any of the contents should flow into it. I desire to call particular attention to the fact that these embossed portions 5 not only form joints for the purpose of preventing the contamination of one egg by the contents of a broken egg in another cell, but since each cell is smaller at its bottom than at its top these embossed portions 5 take up the slack in the board when it is being impressed, since it will be observed that the members 5 are larger at the bottoms than at the tops. There is between each cell and between the outer cells and the edge of the casing a strong bracing member such as those shown at 8. Therefore there is no tendency for the cells themselves to have a relative movement toward and away from each other. Now when the eggs reach their destination they are removed from their receptacle. The portion C is detached from the portion B along the perforated line 7. Eggs are placed in the portion A and the portion B is folded over on the portion A, the edges of the portions A and B being secured by pasting them or by any convenient fastening means. The portions A and B therefore constitute a carton in which twelve eggs may be sold. This obviates the necessity of providing a special carton for this purpose. The portion C may be filled with eggs and a similar portion C from another sheet may be torn off and used as a cover, the edges being secured in any suitable manner. Thus the portion C serves as a semi-carton.

In Fig. 9 I have shown a modified form of the device in which the edges of the embossed portion 4, instead of being brought together as they are at 4$^x$ in Figs. 3 and 4, continue to the ends of the sheet so as to provide an air space. It may be sometimes desired to ventilate the eggs and where these edges are left open, as in Fig. 9, the air will pass through the grooves formed by the embossed portions 4 and will circulate through the cell in the manner shown.

In Figs. 6, 7 and 8 I have shown a modified form of the invention. In these figures it will be seen that the lower portion 3$^a$ of the cell comes almost up to the top of the egg 9. The cells are formed in the same manner as those shown in connection with Fig. 2, that is, each side of the cell is formed by folding adjacent portions of the board 1$^a$ so as to bring these portions into registration. In this form of the device the bosses 4$^a$ which are similar to the bosses 4 are also provided. Instead of making use however of a top portion which is a duplicate of the bottom portion, as in Fig. 2, I provide a top made like that shown in Fig. 8. This top portion consists of a central sheet 10 which has embossed upon it a series of concentric rings such as those shown at 11, 12 and 13. The ring 13 is in fact a socket, as will be seen from Fig. 7, this socket being arranged to receive the bottom portion of the cell 3$^a$ in the layer above it. The edges of the sheet may be secured in any suitable manner.

In packing the case the tops may be placed upon the cells in the manner shown in Fig. 7, and these tops besides forming an air-tight covering for the eggs also form spring cushions for the cells above them. The purpose of embossing the rings is to strengthen the cover and also to provide for the cushioning effect. With this form as with the one previously described the registering bosses 5 are provided to prevent the contests of one cell from entering another.

I claim:

1. In an egg carrier, a bottom portion consisting of a series of cell portions impressed from a single sheet, each cell portion having foldable embossed halves arranged to register, the parts between the cells constituting bracing members for the cells, each of said bracing members being provided with curved embossed portions, and one of said embossed portions being arranged to fit within the companion embossed portion, thereby preventing a flow of the contents from one cell into the other.

2. An egg carrier comprising a bottom portion and a cover, the bottom portion consisting of a series of cell portions, each cell portion having foldable embossed halves arranged to register, integral bracing members between adjacent cell portions, and means carried by said bracing members for preventing a flow from one cell to the other.

3. An egg carrier comprising a bottom portion and a cover, the bottom portion consisting of a series of cell portions, each cell portion having foldable embossed halves arranged to register, integral bracing members between adjacent cell portions, means carried by said bracing members for preventing a flow from one cell to the other, said last named means comprising a curved embossed portion on each of said foldable members, one of said embossed portions being arranged to fit within the other, all of said cell portions, said braces, and said embossed portions being struck from one sheet, and strengthening bosses struck from said sheet between each of said cell portions and the adjacent cell portions on each side of it.

4. An egg carrier comprising a bottom portion and a cover, the bottom portion consisting of a series of cell portions, each cell portion having foldable embossed halves arranged to register, integral bracing members between adjacent cell portions, and means carried by said bracing members for preventing a flow from one cell to the other, said last named means comprising a curved embossed portion on each of said foldable members, one of said embossed portions being arranged to fit within the other, all of said cell portions, said braces, and said embossed portions being struck from one sheet, said cover portion comprising a series of spring tops embossed from a single sheet, each of said spring tops being arranged to register with a cell portion beneath it and having a socket arranged to receive the cell portion above it.

RISDON MOORE ODELL.

Witnesses:
H. ATKINSON,
LEO COURTNEY.